(12) United States Patent
Paradiso et al.

(10) Patent No.: US 7,643,015 B2
(45) Date of Patent: Jan. 5, 2010

(54) SYSTEMS AND METHODS FOR TRACKING IMPACTS

(75) Inventors: Joseph A. Paradiso, Medford, MA (US); Che King Leo, Cambridge, MA (US); Nisha Checka, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1228 days.

(21) Appl. No.: 10/155,874

(22) Filed: May 24, 2002

(65) Prior Publication Data

US 2003/0217873 A1 Nov. 27, 2003

(51) Int. Cl.
*G06F 3/043* (2006.01)
(52) U.S. Cl. .................................. 345/177; 178/18.04
(58) Field of Classification Search ................. 345/173, 345/177; 178/18.04, 19.02; 367/13
See application file for complete search history.

(56) References Cited

U.S. PATENT DOCUMENTS

| | | | | |
|---|---|---|---|---|
| 4,025,724 A | * | 5/1977 | Davidson et al. | 381/71.2 |
| 4,980,518 A | * | 12/1990 | Kobayashi et al. | 178/18.04 |
| 5,097,415 A | * | 3/1992 | Yoshimura et al. | 178/18.04 |
| 5,530,678 A | * | 6/1996 | Kosalos | 367/13 |
| 5,757,266 A | | 5/1998 | Rider et al. | 340/323 |
| 6,138,512 A | * | 10/2000 | Roberts et al. | 73/570 |
| 6,329,910 B1 | * | 12/2001 | Farrington | 340/436 |
| 6,370,964 B1 | * | 4/2002 | Chang et al. | 73/862.046 |
| 6,933,930 B2 | * | 8/2005 | Devige et al. | 345/173 |
| 2001/0006006 A1 | * | 7/2001 | Hill | 73/606 |
| 2003/0066692 A1 | * | 4/2003 | Devige et al. | 178/18.04 |

FOREIGN PATENT DOCUMENTS

WO    WO 02/01490    *    1/2002

OTHER PUBLICATIONS

Paradiso et al. "Sensor systems for interactive surfaces", IBM Systems Journal, vol. 39, Nos. 3&4 (2000).*
Bennett et al. 1988 Ultrasonics Symposium, IEEE, p. 1049-1052.*
Intelligent Vibrations, http://www.i-vibrations.com/english/index.html, at least as early as Jul. 2002, printed Sep. 2002, 38 pages.
Checka, "A System for Tracking and Characterizing Acoustic Impacts on Large Surfaces," Thesis available at *Massachusetts Institute of Technology*, May 24, 2001.
Paradiso et al., "Sensor Systems for Interactive Surfaces," *IBM Systems Journal*, vol. 39, Nos. 3&4, pp. 892-914, 2000.

* cited by examiner

*Primary Examiner*—Ryan R Yang
(74) *Attorney, Agent, or Firm*—Norma E. Henderson

(57) ABSTRACT

Surface impacts are located and characterized based on an acoustic signal produced by the impact despite the presence of signal dispersion. Acoustic signals from the surface may be compared to acoustic signals detected external to the surface in order to eliminate spurious impact sensing due to external sounds. Low-frequency acoustic signals may be sensed and identified as explicit hard "bangs" which are of limited utility for pointing and tracking applications.

12 Claims, 6 Drawing Sheets

KNUCKLE TAP

METAL TAP

SYSTEMS AND METHODS FOR TRACKING IMPACTS

FIELD OF THE INVENTION

The invention relates generally to the field of acoustic signal processing and, in particular, to acoustic signal processing for locating surface impact coordinates.

BACKGROUND OF THE INVENTION

Interest in converting inanimate surfaces such as walls, floors, windows, and the like into sensate surfaces (e.g., surfaces that can locate and characterize object contact, impacts or proximity) has recently grown. The heightened interest is, in part, a result of increased attention to large-scale interfaces for human-computer interaction in smart homes, public spaces, workplaces, etc. Generally, a sensate surface is created with the addition of transducers on, adjacent to, or integral with the surface. The transducers track the positions of objects on or adjacent the surface.

Much development has gone into the production of "touch screens," a common example of an interactive surface that tracks the position of fingers against a video monitor. The technologies in touch screens (resistive sandwiches, active acoustic absorption tracking, capacitive sensing, infrared LED-receiver grids, for example) generally do not scale gracefully to large interactive surfaces (e.g., of over a meter in length), because of complexity and expense. Large video displays (e.g., from video walls and projections) are already becoming common in public spaces, but are not yet interactive, partly because of the difficulties inherent in reliably and economically scaling the appropriate technologies for tracking hands across the active surface.

Impact-locating systems are one current area of sensate-surface development. Some impact-locating systems identify the location of a surface impact by analyzing the resulting acoustic signal. This approach is attractive because of its simplicity, economy, and minimal interference with the surface (a set of contact transducers may be glued onto the surface to receive the acoustic wavefront from the impacts); people can simply knock or tap on the surface to interact. Glass is a ubiquitous material used for large surfaces in present-day construction. Because glass is transparent, it can be used to dynamically display information behind the surface, and is therefore an attractive material for use as a sensate surface. As all sensors can be mounted on the inside surface of a single-paned sheet of glass, it is well-suited for instrumenting outside-facing windows; e.g., it forms a straightforward, secure, and practical means for making shop windows interactive for passers-by outside. However, acoustic signal propagation in glass is characterized by dispersion, i.e., different frequencies propagating at different velocities, creating the tendency of the signal to spread out as it travels along the glass surface.

The dispersive nature of acoustic signals in glass is problematic for impact-locating systems because the time of arrival of the acoustic signal at each transducer location is difficult to determine. For signals originating from an impact on glass, dispersion is generally seen as a variable amount of low-amplitude higher-frequency acoustic signals that often travel ahead of the main wavefront. The dispersion results in an acoustic signal whose characteristics vary as the distance from the impact increases. Thus, the acoustic signal characteristics received at each transducer will vary from one another unless the transducers are precisely equidistant from the point of impact. Additionally, the frequency components created by an impact can vary, depending upon the object that strikes the surface, causing a corresponding variation in the primary acoustic propagation velocity through dispersion. Thus, a specific propagation velocity cannot be assumed when determining the impact coordinates unless the impact source is known or characterized.

In theory, the differential time of arrival of the acoustic signal between each of at least three transducers allows an impact location to be determined. One such approach is described by Paradiso et al. in "Sensor Systems for Interactive Surfaces," *IBM Systems Journal*, Vol. 39, Nos. 3 & 4 (2000). In accordance with the approach described therein, impact-location coordinates are mapped based upon the differential timings of the acoustic signal received at each of four transducers. However, because the differential time of arrival must be determined, the leading edge of the acoustic signal must be accurately identified so that the signal arrival time at each transducer is detected consistently. In practice, the approach described in the above-mentioned article can fail to accurately locate the impact coordinates when signal dispersion prevents accurate identification at each transducer of both the acoustic signal wavefront and the corresponding acoustic signal time of arrival. Additionally, the preceding approach fails to detect low-frequency acoustic signals created by certain impact sources, e.g., a fist, and can be vulnerable to interference from ambient noises.

SUMMARY OF THE INVENTION

Impact-locating is most effective when the acoustic-signal wavefront is accurately identified despite signal dispersion. An improved approach to locating impacts includes signal analysis that accurately identifies the acoustic signal wavefront and the corresponding acoustic signal time of arrival even where the acoustic signal includes dispersion.

In one aspect, the invention locates an impact on a surface after receiving, at a plurality of locations, an acoustic signal created by the impact by cross-correlating the received signals to determine an arrival time at each location.

In another aspect, the invention locates an impact on a surface after receiving an acoustic signal created by the impact, but ignores acoustic signals created by external sounds. In one embodiment, the invention includes an air transducer that detects acoustic signals created by external sounds. In a version of this embodiment, the air transducer is a crystal microphone.

In a further aspect of the invention, low-frequency acoustic signals created by surface impacts are detected at one or more locations. In one embodiment, the invention detects low-frequency acoustic signals below 50 hertz. In one version of this embodiment, the low-frequency acoustic signals are detected by an electrodynamic cartridge.

In still another aspect of the invention, an impact on a surface is located by removing wave dispersion effects from the wavefront of an acoustic signal received at a plurality of locations. In one embodiment, the invention features an acoustical model of the surface. In another embodiment, an impact source is identified.

In still a further aspect of the invention, a graphical user interface is created on a surface by a combination comprising a plurality of sensors that detect surface impacts, a data acquisition system that determines impact locations on the surface using cross-correlation, and an image generator that responds to the data acquisition system. In one embodiment, the invention includes a laser rangefinder to also track the continuous position of hands above the surface. In another embodiment, the invention includes a microwave or other rangefinder that can sense through the glass and respond to people and objects approaching.

In yet another aspect of the invention, an impact source is characterized. In one embodiment, a data acquisition system is calibrated with known acoustic signal characteristics for at least one impact source, an acoustic signal created by an impact source is received at one or more locations, and the acoustic signal is analyzed with the data acquisition system. In another embodiment, a wave velocity is determined.

BRIEF DESCRIPTION OF THE DRAWINGS

FIG. 1A is an acoustic signal created by a knuckle tap. FIG. 1B is an acoustic signal created by a metal tap.

DETAILED DESCRIPTION

1. Acoustic Signal Propagation

Acoustic signal propagation depends, in part, on the acoustic properties of the material comprising the sensing surface. Acoustic properties are those that affect acoustic signal transmission through the surface material. For example, these properties may affect either or both of the acoustic signal velocity and the signal attenuation. As a result, impact-locating systems and methods desirably account for acoustic properties of the sensing surface.

Further, the impact source (e.g., knuckle tap, metal ring, etc.) also affects the acoustic signal. A glass sensing surface provides one example. An lower frequency acoustic signal created when glass is struck with a relatively soft impact source, such as one or more knuckles or fingertips, propagates more slowly than a higher-frequency acoustic signal created when a sharp impact is made on the glass surface, for example, when the surface is struck with a rigid object. In glass, the transmission speed of signals generated by sharp impacts may be up to ten times greater than the transmission speed of signals generated by soft impacts. For example, in a panel of safety glass 1 cm thick, propagation velocities of 1200 m/sec for knuckle taps and 2000 m/sec for metal taps were observed. Additionally, the propagation speed is affected by both the thickness of the surface and the surface material. For example, propagation speeds observed in safety glass having a thickness of 1 cm are roughly 40% faster than propagation speeds observed in tempered glass having a thickness of 0.635 cm.

Sharp-impact and soft-impact sources are further distinguished by the nature of the acoustic signal that each generates. When a glass surface is struck with a relatively soft-impact source, both structural acoustic signals and audible acoustic signals are transmitted in the sensing surface. The structural acoustic signals are referred to as flexural waves. A flexural wave is structural in nature because it propagates by deflection within the material through which it travels. Flexural waves include both high- and low-frequency components. They are difficult to analyze because a flexural waveform spreads out as it propagates from the impact origin. This effect, referred to as dispersion, results because higher frequency flexural waves travel faster than lower frequency flexural waves.

Figure 1A:
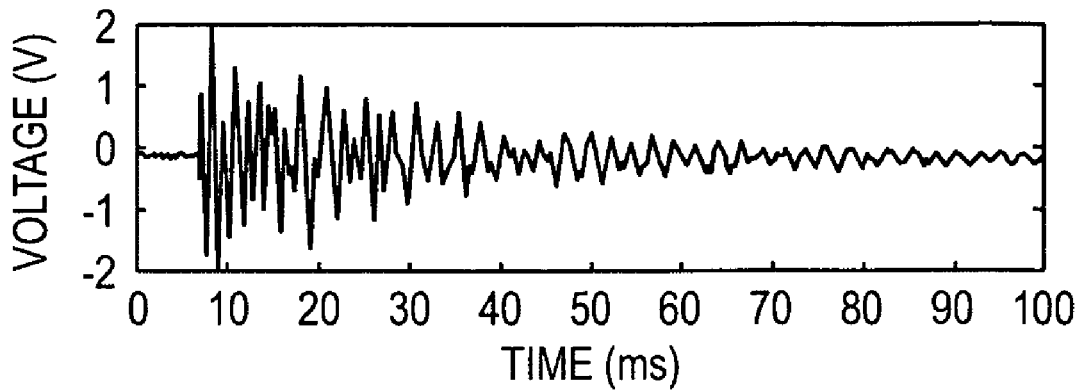
FIGS. 1A and 1B are graphs of acoustic signals in glass.
Figure 1B:
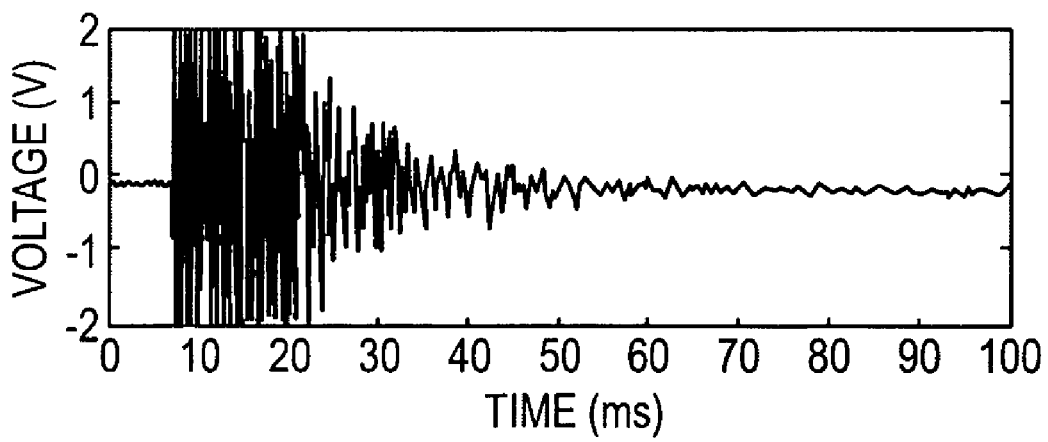

FIGS. 1A and 1B illustrate the difference in acoustic signals generated by different impact sources. FIG. 1A shows an acoustic signal resulting from a knuckle tap on a glass surface, whereas FIG. 1B shows an acoustic signal generated by striking a metal ring against a glass surface. The waveform of FIG. 1A demonstrates the effects of dispersion on the acoustic signal created by the knuckle tap. The dispersion results in a signal that includes a variable amount of low amplitude, higher-frequency components that often arrive before the lower-frequency signal components. In FIG. 1A, the change in signal frequency is most clearly seen as the signal decays. However, the effects of dispersion also make it more difficult to determine when a particular acoustic signal has arrived at a given transducer location because the rising edge of the signal is less clearly defined.

As can be seen in FIG. 1B, sharp impacts propagate via an acoustic mode that maintains both a stiffer rising-edge and more uniform frequency, and is generally not distorted as much by dispersion. Thus, signal detection is more straightforward for sharp impacts because the acoustic signal arrival time is more easily determined.

2. System Overview

Figure 2:
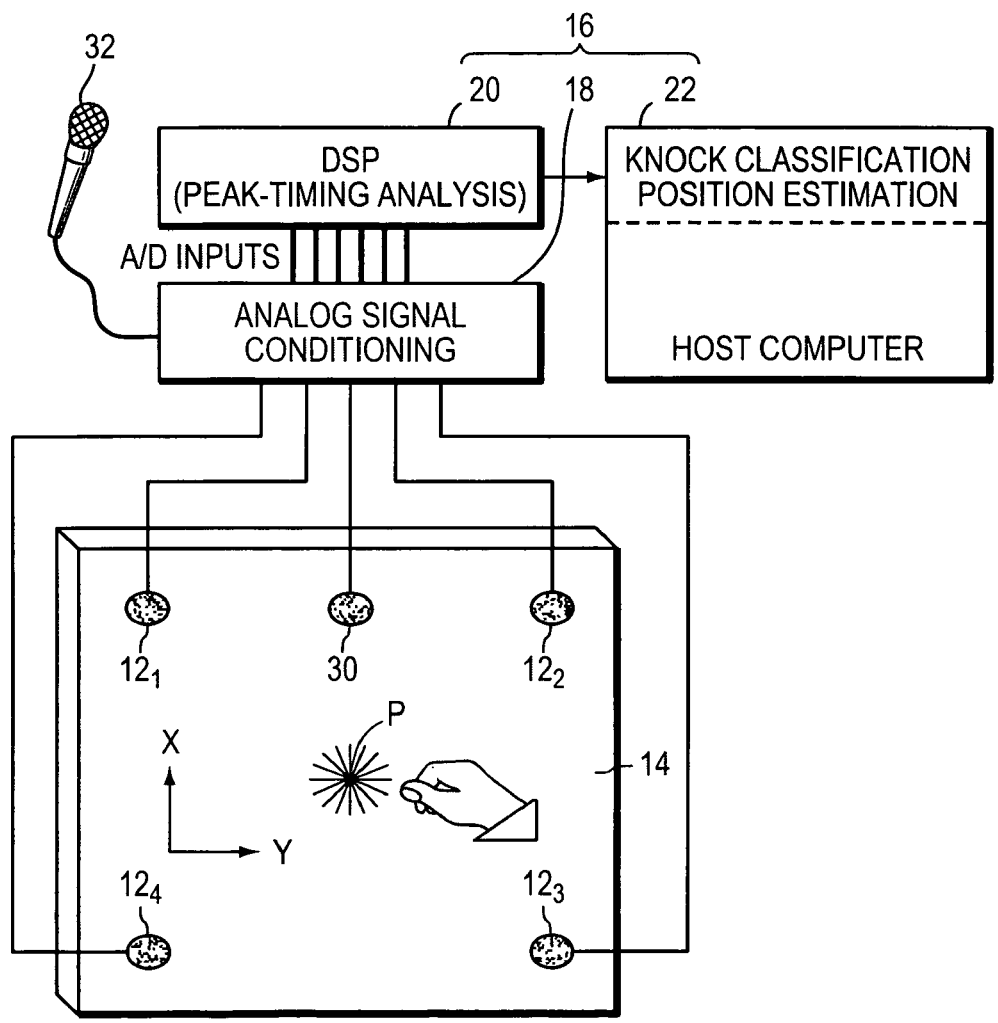
FIG. 2 is a block diagram of an impact-locating system in accordance with the invention.

Referring now to FIG. 2, an impact-locating system 10 includes a plurality of transducers $12_1$, $12_2$, $12_3$, $12_4$ (collectively, transducers 12) located on a sensing surface 14. Only three transducers 12 are required to accurately locate impact coordinates on a two dimensional sensing surface 14. The fourth transducer 12, while not necessary, is preferred for redundancy and error checking. In the embodiment shown in FIG. 2, one transducer 12 is located adjacent each of the four corners of sensing surface 14. However, the transducer location may be varied to include, for example, edge-centered orientations, circular orientations, asymmetrical orientations, associated transducer pairings, and the like so long as the system is configured and calibrated to accommodate the selected orientation. In one embodiment, the transducers 12 are located away from the edge of sensing surface 14 in order to reduce both signal attenuation and the effects of signal reflection.

In one embodiment, the transducers 12 are electret microphones. In another embodiment, the transducers 12 are made of polyvinylidene fluoride (PVDF). In still another embodiment, the transducers 12 are piezoceramic transducers. In one version, the piezoceramic transducers detect acoustic signals with a frequency of 300 Hz-5000 Hz. The transducers 12 may be attached directly to the sensing surface 14. A variety of attachment means may be used including adhesives, fasteners such as nuts, bolts, and screws, and the like so long as the transducer 12 is mechanically secured to the sensing surface 14 and is capable of receiving acoustic signals propagating therealong.

Figure 4:
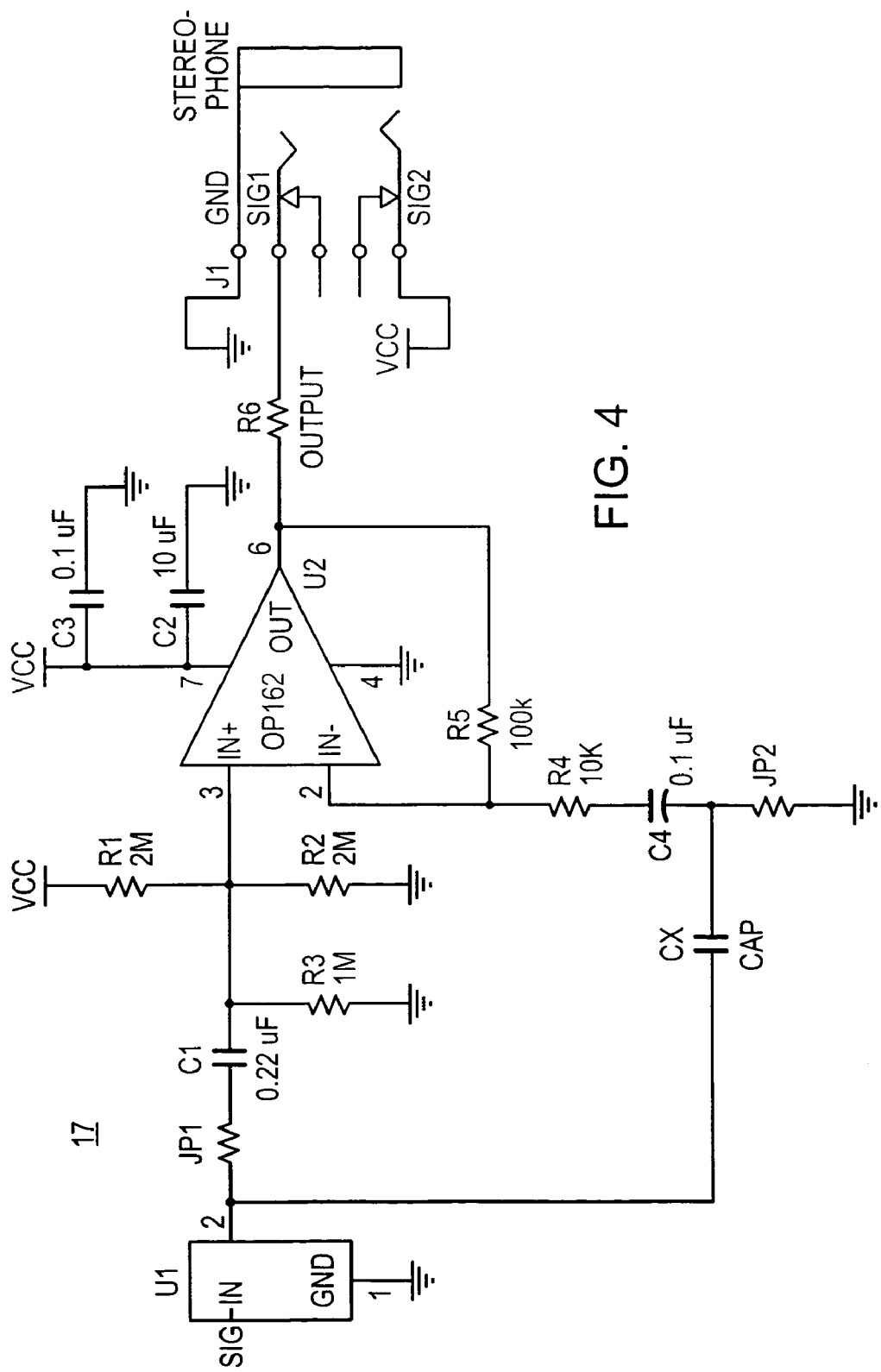
FIG. 4 is a schematic of a pre-amplifier in accordance with the invention.

Output signals from each transducer 12 are supplied to a data acquisition system 16. The transducer 12 output signal may be amplified with a pre-amplifier 17 (FIG. 4) to increase the output signal strength and improve the signal-to-noise ratio of the output signal. In one embodiment, a separate pre-amplifier 17 is mounted with each transducer 12. The pre-amplifiers 17 may also be shielded to reduce the effects of electromagnetic interference. In one version, the pre-amplifiers 17 are shielded with copper shielding.

Figure 5A:
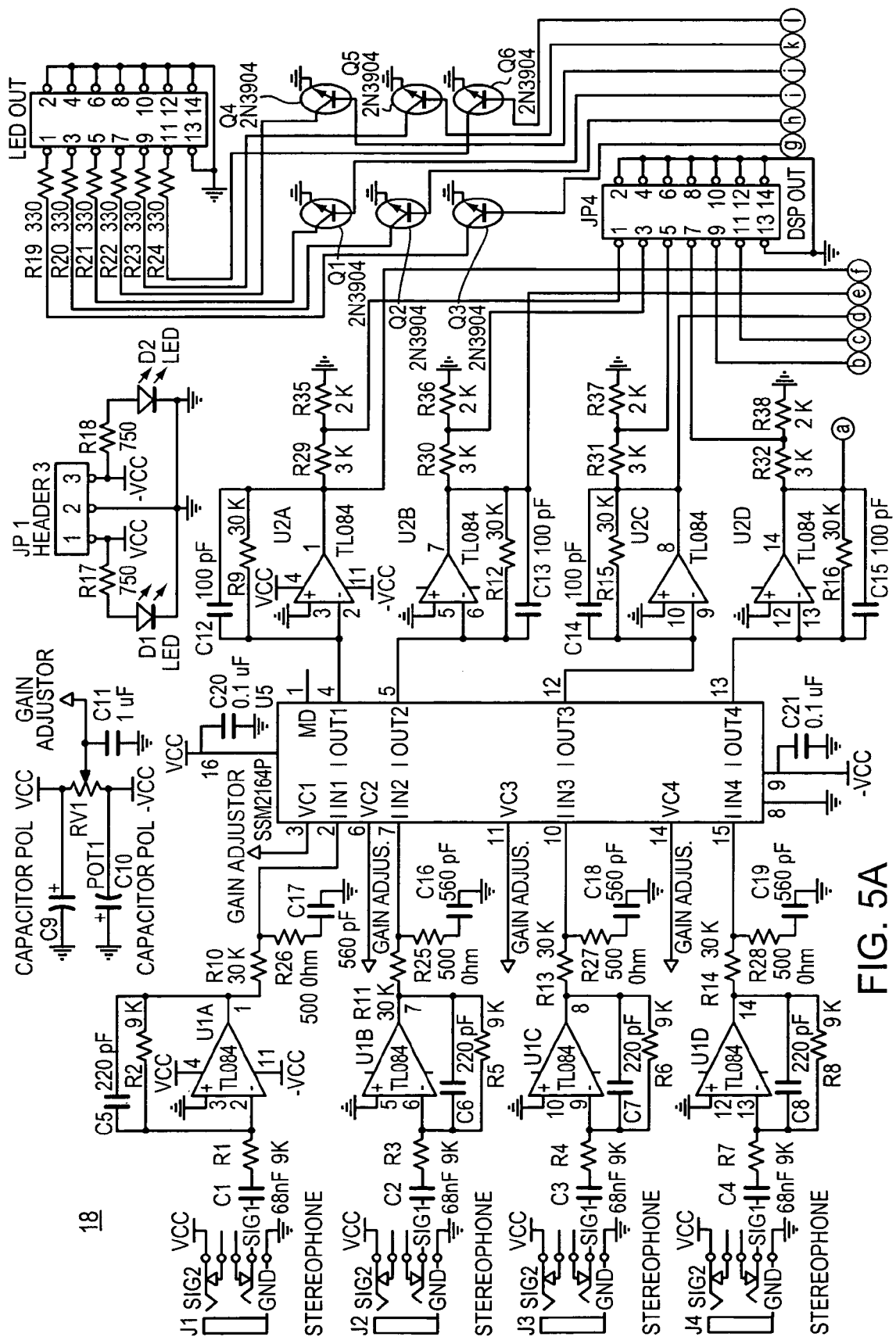
FIG. 5 is a schematic of an analog signal conditioner in accordance with the invention.
Figure 5B:
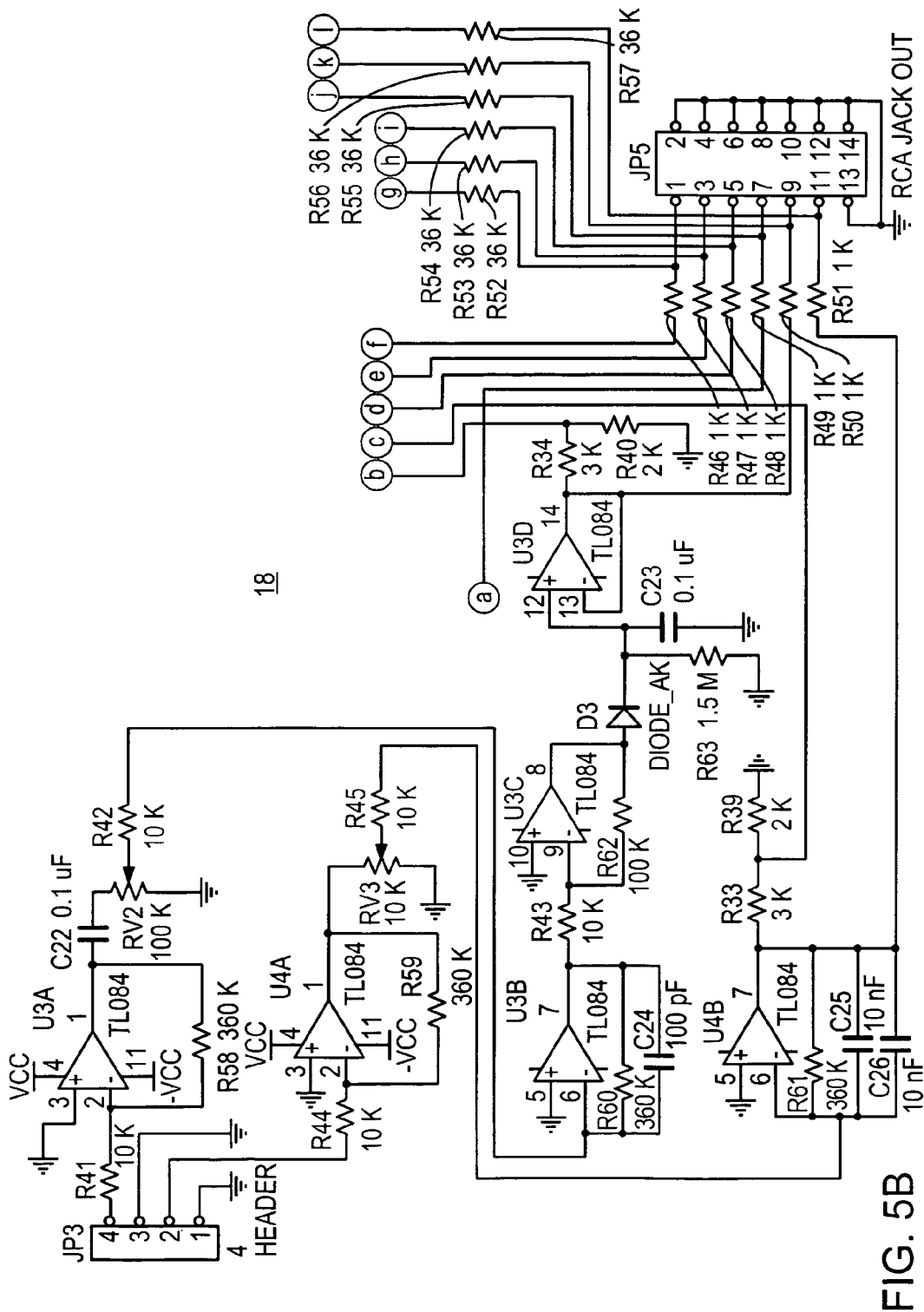

In one embodiment, the data acquisition system 16 includes a signal conditioner 18, a digital signal processor 20, and a computer 22. The data acquisition system 16 continuously samples the output of each transducer 12. In the embodiment shown in FIG. 2, there are a total of four channels that are monitored, one channel for each transducer 12. A rolling buffer (not shown) in the data acquisition system 16, typically implemented in a random-access memory of computer 22, receives the inputs from each channel in digital form. A signal conditioner 18 schematic is shown in FIG. 5.

Advantageously, the digital signal processor 20 has a sampling rate substantially greater than the highest frequency signal detected by transducers 12 in order to provide ample waveform detail for signal analysis. In one embodiment, the sampling rate of the digital signal processor 20 is ten times greater than the highest frequency signal detected by the transducers 12. Because serial input ports are commonly available in computers 22, it is also advantageous for the digital signal processor 20 to be equipped with a serial output connection.

As is discussed in greater detail below, the data acquisition system 16 is preferably calibrated to the acoustic properties of sensing surface 14. Algorithms described below are used by the data acquisition system 16 to determine the impact source and impact location P. The signal conditioner 18 filters the transducer outputs and converts them from an analog format to a digital format, and the resulting digital data is received by computer 22 via a serial link. In one embodiment, the digital signal processor 20 performs peak timing analysis while the computer 22 performs impact source characterization and impact location estimation. The computer 22 may be a personal computer or any type of processing system such as a microprocessor, that can be programmed to execute the impact-location algorithms described herein.

The embodiment shown in FIG. 2 includes cable interconnections between the various impact-locating system components. However, in another embodiment, the transducers 12 communicate with the data acquisition system 16 via radio frequency (RF) or optical signals and cable interconnections are not required.

Arrival of the acoustic signal at a transducer 12 is determined to occur when the acoustic signal exceeds a preset threshold. When a signal is detected, its digital representation (generated by digital signal processor 20) is stored by computer 22 in a rolling buffer assigned to that transducer 12. The threshold may be any signal level so long as it is above the noise level and can be unambiguously detected. In one embodiment, the threshold is an acoustic waveform peak value determined by a system designer. A triggering event occurs when the acoustic signal received from any one of the plurality of transducers 12 exceeds the threshold. Triggering events cause the data acquisition system 16 to store and analyze acoustic signal information from the transducers 12. In one embodiment, the acoustic signal information that is stored and analyzed is received between a time just preceding the triggering event and a time immediately following the triggering event. This data storage approach is advantageous, in part, because the arrival time of the acoustic signal at each transducer 12 is likely to be different. Thus, this approach allows the acoustic signal arrival time to be determined for each transducer 12 regardless of whether the transducer 12 is the first to detect an acoustic signal created by a surface impact. This approach also enables robust triggering on the higher amplitudes generated by an impact, while still digitizing and storing the much lower amplitude signals that come beforehand, such as higher-frequency components separated by dispersion.

In one embodiment, a dynamic threshold may reduce false triggers that can be created by peak amplitude magnification resulting from acoustic signal reflection and associated signal coupling between a signal created by a newly-occurring impact and a reflected or resonating signal from an earlier impact. In this embodiment, the threshold adjusts upward immediately after an impact is sensed and gradually returns to the original threshold during a preset time period, provided that no intervening impacts occur. The system still responds to intervening impacts (although with less sensitivity because of the higher threshold), but is not falsely triggered by residual sound in the glass remaining from the previous impact.

In one embodiment, the digital signal processor 20 detects the triggering event. In a another embodiment, a digital signal processor 20 is not used and the computer 22 analyzes the acoustic signals for triggering events. The acoustic signals from identical time periods are analyzed for each transducer 12.

In one embodiment, the data acquisition system 16 continuously samples the signals from each transducer 12 and stores them, on a continuous basis, in a corresponding rotating buffer. Upon detecting a transducer signal above a noise threshold, triggering event is declared, and data from each transducer 12 is collected for a fixed period (e.g., 10 msec), after which data collection stops and the contents of the rolling buffers remain fixed for analysis. The stored data may include 3 msec of data from before the triggering event. The buffers are then scanned for every significant peak on the waveform produced by each transducer 12 and descriptive parameters such as peak height, peak width, and mean arrival time relative to the initial trigger, are preferably determined for each peak.

As shown in FIG. 2, the system 10 may also include a low-frequency transducer 30 and/or an air transducer 32. The low-frequency transducer 30 is used to detect impacts that create low-frequency acoustic signals (e.g., those below approximately 50 hertz). These low-frequency signals are generally attributed to "bash" impacts on the sensing surface 14, e.g., when a fist bangs a pane of glass. Low-frequency acoustic signals, unlike those created by knuckle taps or metal taps, do not provide a strong response on the preferred piezoelectric transducers. Consequently, the bash-type impacts are not as easily detected with the transducers 12. Moreover, because bash-type impacts produce low-frequency acoustic signals it is difficult to use the signal to precisely locate the bash impact, although in some instances an approximate impact location may be determined. Thus, low-frequency transducer 30 may detect bash-type impacts in order to inform the user of an error condition if the impact location cannot be localized with sufficient accuracy, or to suggest a different type of impact. Additionally, the very fact of a bash-type impact may have some significance in the context of an interactive display (e.g., a game), regardless of its location. In one embodiment, the low-frequency transducer 30 is an electrodynamic cartridge. In a version of the preceding embodiment, the diaphragm of the electrodynamic cartridge is attached to the sensing surface 14. Because of the slower response time of the low-frequency signal detection circuit, an extended sample storage period is used with the low frequency transducer 30. In one embodiment, in addition to pre-trigger data storage, 17 msec of post trigger data is stored for low-frequency impacts.

The air transducer 32 is used as an external noise discriminator, i.e., to detect ambient noise that can interfere with robust detection. For example, sharp sounds (e.g., very loud claps or snaps) produced in the vicinity of the sensing surface 14 are not created by sensing surface 14 impacts, but may nonetheless couple enough energy into the system 10 to trigger false impact sensing. In one embodiment, the air transducer 32 is a crystal microphone. However, other transducers such as dynamic, piezoelectric, or electret microphones and the like may also be used so long as they respond strongly to ambient sounds that trigger false impact sensing. Thus, any events that are detected from this channel in a substantial way (i.e., those having a signal strength above a specified discriminator threshold) are treated as being produced by external sounds, and any resulting signals from transducers 12 are ignored by data acquisition system 16. The output signal of air transducer 32 may be filtered and amplified to eliminate noise and improve the signal-to-noise ratio of the output signal.

In one embodiment, the signal conditioner 18 includes peak sensing circuitry that, based on a comparison between the signal strength received from each of transducers 12, 30, and 32, determines if a sensing-surface impact or an external sound created the acoustic signal, and if the acoustic signal was created by a surface impact, the type of impact (e.g., low frequency) that created the signal. Low-frequency impacts and external sounds are generally poorly detected by transducers 12. Thus, peak sensing circuitry is advantageous for this purpose because the peak strength of the transducer 12 output signal is correspondingly low for low-frequency impacts and external sounds.

Alternatively, the functions performed by the air transducer 32 may instead be performed by additional processing of signals received from the transducers 12 in order to discriminate between impacts and external sounds. Similarly, low-frequency signal detection may be provided by additional processing of the output signals provided by transducers 12, facilitating omission of the low-frequency transducer 30.

Because some very nearby cellular phone signals may be detected by the transducers and preamplifiers 12 and interfere with system operation, a means of preventing false impact sensing resulting from cellular phone signals can be desirable. In one embodiment, cellular phone interference is identified by the relatively rapid signal decay of the cellular phone signal pulses, and the system does not trigger when such a signal is identified. In one version of this embodiment, a conventional wave-shape identification algorithm in the digital signal processor 20 prevents false triggering that would otherwise result from electromagnetic interference.

3. System Calibration

Because of the unique acoustic characteristics and wide range of available sensing surfaces 14 and impact sources, the impact-locating system may be calibrated when it is first combined with a sensing surface 14 in order to optimize system performance. In one embodiment, the calibration is performed by creating surface impacts and recording the acoustic signal parameters (e.g. signal frequency, signal velocity, etc.) for each impact. The impacts may be made with impact sources that will be applied to the fully operational system (e.g., knuckles, metal rings, etc.). The calibration may also include recording the dimensions of both the sensing surface 14 and an image-projection surface to correlate impact locations with locations within the image. System calibration may be accomplished with a program stored in computer 22.

As a result of the calibration, system operation may be improved in the following areas: 1) transducer position optimization; 2) impact source identification accuracy; 3) impact locating accuracy; and 4) correspondence between impacts and interactive display responses. For example, where a graphic image is displayed on or adjacent the sensing surface 14, an accurate translation between the coordinates on the sensing surface 14 and the pixels of the image will enhance system performance by facilitating an appropriate response for an impact occurring at a particular coordinate on the surface 14.

In another example of improvements that may be achieved through calibration, transducer 12 locations may be optimized by utilizing multiple transducer locations during calibration to determine those locations which are least affected by dispersion, reflections from edges, or modal oscillation in a specific sensing surface 14 application. In the fully operational system, the transducers 12 may be installed at the low-dispersion, low-reflection, and/or nodal locations.

4. Cross-correlation and Signal Analysis

Figure 3:
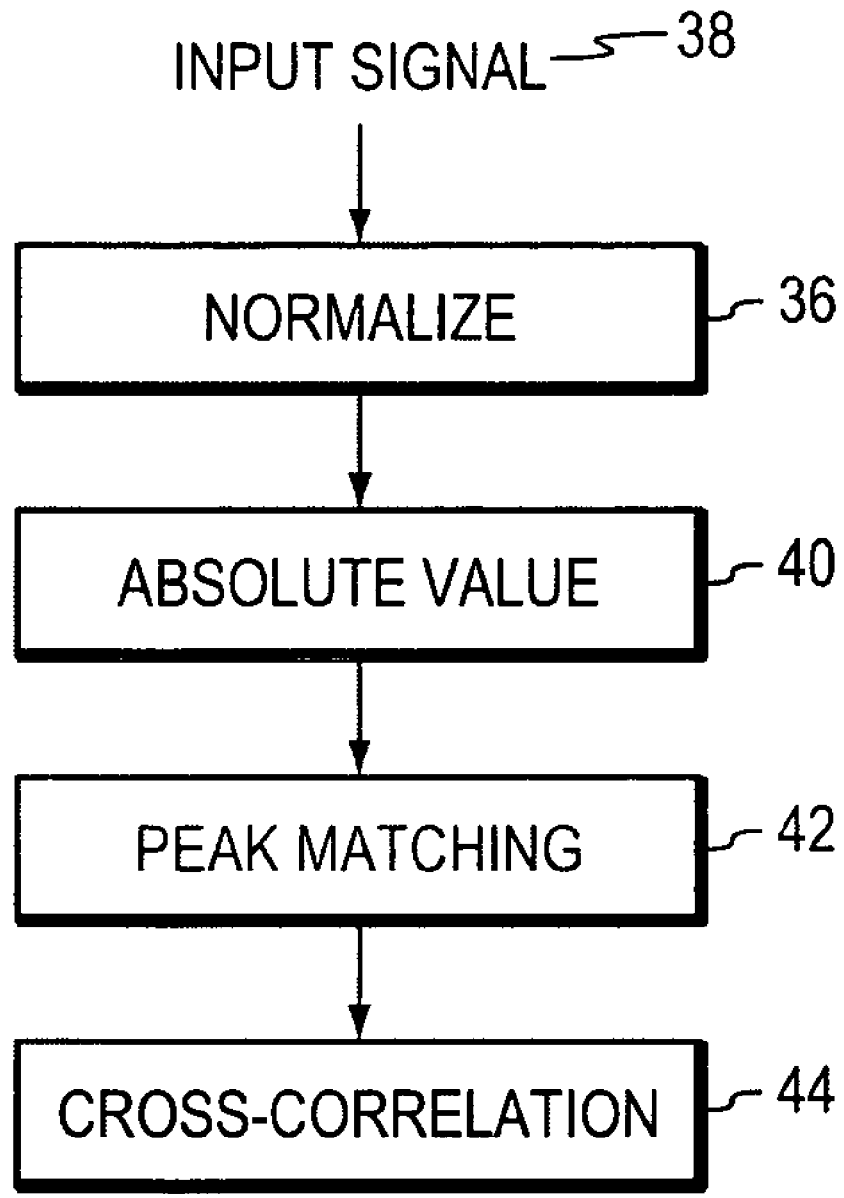
FIG. 3 is a flow chart of signal analysis performed on an acoustic signal in accordance with the invention.

FIG. 3 illustrates the signal analysis performed in an embodiment of the present invention. First, in step 36, the input signal 38 is zero-referenced by subtracting any initial bias in the signal 38, then normalized, allowing the signals 38 from different transducers 12 to be compared regardless of the absolute amplitude of each signal 38. Then the absolute value can be taken (step 40), which eliminates negative signal values that occur due to the generally sinusoidal shape of the acoustic signal. Peak matching (step 42) is then performed using the normalized signals from a pair of transducers 12. The objective is to examine the parts of the signal 38 that are least corrupted by dispersion or reflections.

Step 36 and step 40 may be performed on the sampled waveform $\tilde{x}[n]$ as shown below in Equation (1), which calculates the zero level by averaging the first 50 samples in the pretrigger (which arrived before the impact wavefront, and hence represent the ambient condition):

$$\tilde{x}[n] = \left| x[n] - \frac{1}{50} \sum_{0 < i \leq 50} x[i] \right| \qquad (1)$$

To reduce noise in the system, the signal may be filtered using Equation (2). In one embodiment a finite impulse response filter is used.

$$\tilde{x}[n] = \frac{\tilde{x}[n-1] + \tilde{x}[n]}{2} \qquad (2)$$

Because dispersion causes higher frequencies to travel faster, they arrive first, so it is generally preferred to examine the part of the signal 38 having the highest dominant frequency. Because all waveforms arise from the same source, certain conditions or heuristics can be used to identify the optimal peaks or lobes within a signal 38 that will be mostly likely yield meaningful comparisons to corresponding lobes in the other signals 38. For example, in one embodiment, if $s_i$ is the sample representing the ith zero-crossing in the sampled waveform $\tilde{x}[n]$, the lobes that are chosen from $\tilde{x}[n]$ are those within the range $s_i \leq n \leq s_{i+N}$ such that, for some set of constants $\delta_1, \delta_2, \epsilon$, the following heuristic conditions are met:

$$\max_{s_i \leq n \leq s_{i+1}} \tilde{x}[n] > (1 + \delta_1) \max_{0 \leq n \leq 50} \tilde{x}[n] + \varepsilon \qquad (3)$$

-continued $$\max_{S_{i+j+1} \leq n \leq S_{i+j}} \tilde{x}[n] > \max_{S_{i+j} \leq n \leq S_{i+j+1}} \tilde{x}[n], 1 \leq j \leq N-1 \quad (4)$$

$$\max_{S_{i+N-1} \leq n \leq S_{i+N}} \tilde{x}[n] > \max_{S_{i+N} \leq n \leq S_{i+N+1}} \tilde{x}[n] \quad (5)$$

$$\max_{S_{i+N-2} \leq n \leq S_{i+N-1}} \tilde{x}[n] < (1 + \delta_2) \max_{S_{i+N-1} \leq n \leq S_{i+N}} \tilde{x}[n] \quad (6)$$

$$1 \leq N \leq 4 \quad (7)$$

Equation (3) ensures that the smallest lobe will be above some threshhold determined by $\delta_1$ and $\epsilon$. In one implementation, the values $\delta_1$=0.5 and $\epsilon$=0.1 (V) were employed. Because the lobes of interest are those not "contaminated" with frequencies other than the dominant high frequency, Equations (4) and (5) are used to select the set of three largest lobes with ascending maximum heights. It is found, however, that when the waveform saturates quickly, the largest lobe does not necessarily represent the desired lobe. Hence, Equation (6) is utilized to ensure that inaccuracies caused by zero-referencing and absolute-valuing the waveform do not adversely affect the choice of lobes. In particular, setting $\delta_2$=0.1 has been found to address this problem adequately. Finally, Equation (7) ensures that at least one lobe is picked, and minimizes calculations by constraining the number of lobes picked to three or fewer.

Having selected the appropriate lobes from each waveform, the next step is to determine which lobes most closely resemble each other. Assuming constant attenuation of the signal 38 would require normalization of each section before performing any type of comparison. However, to determine which lobe in the set of three lobes corresponds to the lobes of a set from a different signal 38, it is preferred not to normalize the entire set to the same height, since any comparison of these normalized waveforms would likely lead to the conclusion that the first lobe in the first set correlates to the first lobe in the second set.

Accordingly, in one implementation, each triplet of lobes is split into two pairs: the first and second lobes (lobes 1 and 2), and the second and third lobes (lobes 2 and 3). Each set is statistically analyzed to find the distribution of the minimum mean-square error (i.e., the chi-square statistic) of the normalized set of each pair of two lobes from two transducers $12_a$ and $12_b$:

$$\chi_{ab}[n] = \sum_{j=-(S_{i+N}-S_i)}^{S_{i+N}-S_i} (\hat{x}_a[j] - \hat{x}_b[j-n])^2 \quad (8)$$

where $$\hat{x}_p[n] = \begin{cases} \dfrac{\tilde{x}_p[n]}{\max_{S_i \leq n \leq S_{i+N}} \tilde{x}_p[n]} & S_i \leq n \leq S_{i+N} \\ 0 & \text{elsewhere} \end{cases}$$

The set of two normalized pairs of lobes from transducer $12_a$ and transducer $12_b$ whose minimum chi-square function is smallest, is then taken and cross-correlated (step 44) to fine-tune the time difference in samples between the two selected sets of lobes. The position of the peak of the cross-correlation function, set forth below as Equation (9), is used in place of the difference in time-of-flight to transducers $12_a$ and $12_b$; in other words, the cross-correlation is used to determine the differential timing of the acoustic signal at each of the transducers. The cross-correlation is defined conventionally as:

$$\phi_{ab}[m] = \sum_{k=-\infty}^{\infty} \hat{\chi}_a[k] \hat{\chi}_b[m-k] \quad (9)$$

where m and k are indices. In particular, the cross-correlation operation between two signals creates a new signal, indexed as m, and summed over all possible values k from $-\infty$ to $+\infty$. In one embodiment, cross-correlation is improved by locating transducers 12 adjacent one another. The improved cross-correlation results because adjacent transducers 12 may detect a similar acoustic signal as a result of their proximity.

It is to be noted that not all of the calculations described above need be performed to find the peak of the cross-correlation. In particular, it is not necessary to calculate every chi-square statistic, only to throw away all but one of them, i.e., the minimum chi-square statistic. Thus, it is possible to calculate the chi-square statistic for a range of n where it is likely the minimum will occur. In general, a sufficient range is n=$\chi \pm 10$ where $\chi$ is the average of the "center" of the two sets of lobes. Furthermore, since $\hat{\chi}_a[k]$ and $\hat{\chi}_b[k]$ are finite signals, the cross-correlation is straightforwardly computed.

Other suitable approaches to removing or compensating for the effects of dispersion include iterative signal processing and similar compensation techniques. For example, an adaptive filter can be used in conjunction with the localizing algorithm to "stiffen" the rising edge by removing dispersion, thereby yielding a better impact estimate; iterating this process results in a better signal representation and more accurate impact localization. In a further approach, the acoustic signal position may be tracked based on a linear prediction of the signal position. Compensation for dispersion is accomplished by iterating the prediction process over multiple signal positions. The predictive approach may be implemented with filters such as adaptive filters, Kalman filters, Wiener filters, and the like provided that the filters solve for a minimum mean square error. In another approach, iterative calculations are made based on estimated velocity of various frequency components of the acoustic signal. The process includes adjusting the velocity estimates, and calculating both the time of arrival of the signal at each transducer 12 and the corresponding impact coordinates. The differential time of arrival of the acoustic signal at transducer 12 pairs may be determined by either a rising-edge method or the signal analysis shown in FIG. 3. A heuristic may be used to adjust the arrival time difference between the signal arrival at each transducer until the impact coordinate calculated for each transducer pair is substantially the same and the difference between velocity vectors is minimized. In one embodiment, the impact coordinate is determined using Equation (10).

In still a further approach, an iterative method is applied to the acoustic signal in the frequency domain. Here, the effects of signal dispersion are reversed and the acoustic signal is compressed to a single pulse with a distinct rising edge and associated peak amplitude by phase-shifting the signal's dominant frequencies. Iterative calculations are performed to determine when the compensation applied to each frequency component of the signal is correct. When correct compensation occurs the compensated signal matches an ideal pulse and will pass a matched filter output threshold. The matched filter may include an ideal pulse compression. The immediately preceding approach may be simplified by modeling the waveform as the sum of its phase-shifted dominant frequency components. In one embodiment, the model is created based on data produced during a system calibration. Signal compression may also be achieved without the preceding signal analysis by applying transducers 12 that perform signal compression.

The difference in arrival times computed as set forth above are then used to calculate the impact location P. For example, let $t_{ab}$ be the time difference, in samples, between the arrival time at first transducer $12_a$ and the arrival time at second transducer $12_b$. The impact location P is determined using the following equation:

$$\frac{t_{ab} \times c}{\text{sample rate}} = \sqrt{(x-x_a)^2 + (y-y_a)^2} - \sqrt{(x-x_b)^2 + (y-y_b)^2} \quad (10)$$

In Equation (10), x and y are the coordinates of the impact location on the surface. The first transducer $12_a$ is located at coordinates $x_a$ and $y_a$, and the second transducer $12_b$ is located at coordinates $x_b$ and $y_b$. The acoustic signal transmission speed is represented by c. Thus, the speed of the acoustic signal is necessary to determine the impact location.

Where the acoustic signal transmission speed varies depending upon the impact source, the impact-locating system identifies the impact source in order to solve Equation (10) and identify the impact location P.

In one implementation, the impact source is identified by a nearest neighbor algorithm set forth below as Equation (11). The algorithm includes six variables that may be used to characterize the impact source. Four variables $z_1$, $z_2$, $z_3$, and $z_4$ provide an estimate of the frequency content of the acoustic signal received at each of four respective transducers $12_1$, $12_2$, $12_3$, and $12_4$. Two variables, $c_1$ and $c_2$, each provide information related to the velocity of the acoustic signal. The values of the six variables resulting from a new impact are compared with known values of the variables in order to identify the unknown impact source. The known values are calibration samples previously recorded during a surface calibration with one or more known impact sources.

$$d[i] = \sqrt{\sum_{j=1}^{4} \frac{(z_{j:k} - z_{j:i})^2}{m} + \sum_{j=1}^{2} \frac{(c_{j:k} - c_{j:i})^2}{n}} \quad (11)$$

in one approach, the nearest neighbor algorithm determines if the impact source is either a knuckle tap or a metal tap. The variables $z_1$, $z_2$, $z_3$, and $z_4$ provide the total quantity of acoustic signal zero crossings detected by the transducer 12 associated with the variable (e.g., $z_1$, is the number of zero crossings detected at transducer $12_1$) during a given period. In one example, the quantity of zero crossings detected over a 400-sample range is used. The time difference, measured in samples, between the receipt of the signal at transducer $12_1$ and the receipt of the signal at transducer $12_3$ is represented by $c_1$. The time difference, measured in samples, between the receipt of the signal at transducer $12_2$ and the receipt of the signal at transducer $12_4$ is represented by $c_2$. The range of values for $z_1$, $z_2$, $z_3$, and $z_4$ is [0, m], and the range of values for $c_1$ and $c_2$ is [0, n].

The calibration sample set includes multiple values for each impact source, for example, data from 100 knuckle taps and 100 metal taps. This data may be represented as follows:

$$t[i] = z_{1:i}, z_{2:i}, z_{3:i}, z_{4:i}, c_{1:i}, c_{2:i}$$

where i is the sample number for each of the calibration samples. The calibration samples are organized so that samples from each type of impact source are grouped together. For example, the data from the one hundred knuckle taps may be represented by samples i=1 to 100, and the data from the one hundred metal taps may be represented by samples i=101 to 200.

For a newly-occurring surface impact with the following characteristics:

$$t[k] = z_{1:k}, z_{2:k}, z_{3:k}, z_{4:k}, c_{1:k}, c_{2:k}$$

the impact source is determined with Equation (11) by identifying the five calibration samples i such that d[i] has the smallest value over the entire set of samples i. A simple majority of the five samples is calculated to determine if among the five identified samples the majority of samples were found within either the knuckle tap sample group (i=1 to 100) or the metal tap sample group (i=101 to 200). If among the majority i>100 the impact source is identified as a metal tap. Conversely, if among the majority i<100 the impact source is identified as a knuckle tap. Thus, the difference in signal arrival time at the transducers and the number of zero crossings in the signal are correlated to determine the impact source.

The number of calibration samples is selected to avoid incorrect source identification. Too few calibration samples may lead to inaccuracies because too few acoustic signatures are represented. Conversely, too many calibration samples may make the approach too restrictive. Of course, the preceding approach is not limited to knuckle tap and metal tap identification, and may be used with any number of impact sources having signal characteristics that can be distinguished from one another. Where more than two impact sources exist, the number of sample groups will increase to match the number of impact source classes (e.g., three sample groups are provided when the impact source may be classified as being a knuckle tap, a metal tap, or a wood tap).

Not all types of impacts need be analyzed in the same fashion. It is found, for example, that while a combination of correlation and rising edge results may is useful in detecting soft impacts such as knuckle taps and determining the impact location, for hard impacts such as metal taps, the leading edge of the acoustic signal can frequently be determined, obviating the need for correlation and rising edge results. Further, acoustic signal arrival time may be determined by a identifying the signal's initial rising edge and then locating the zero-crossing that occurs immediately following the rising edge. In one embodiment, zero-crossing detection includes narrowing the signal's bandwidth with a bandpass filter.

The impact location is then determined based on the intersection of the hyperbolas defined by Equation (10) as applied to all transducers 12. A calibration may be performed to tailor the computation to the sensing surface 14. The calibration provides a greater degree accuracy for impact-location calculations because propagation characteristics may vary within a surface even when the surface material is contiguous. For example, mechanical loading may affect the propagation velocity of an acoustic signal traveling in one region of the surface.

It is found that metal-tap impact-location results tend to be less accurate than results obtained for soft impacts because of the higher propagation velocity of the acoustic signal generated by hard impacts and ambiguities in determining the rising edge. Generally, higher signal propagation velocities found in thicker material result in decreased impact location accuracy. In practice, the impact-locating system described herein will detect impacts located outside the region bounded by the transducers 12. Accuracy in these regions, especially in the direction orthogonal to the line between the sensors, is generally is not as high as position locating within the bounded region (i.e., the region located between the transducers) because of the asymptotic change of the differential time. Nonetheless, because the overall accuracy of localization based on hyperbolas depends on the sampling rate of digital signal processor 20 (since greater sampling leads to more accurate definitions of peaks and zero-crossings), improvement can be obtained by increasing this rate. Other techniques such as adaptive filtering can also be used to advantage.

If it is assumed, for a rectangular sensing surface 14 with a first dimension a and a second dimension b (where a>b), that the attenuation is proportional to the distance that the signal travels from the impact origin to transducers 12, then the maximum sensing area defined by the bounded region created by transducers 12 mounted at the sensing surface 14 corners is:

$$b\sqrt{x^2-b^2} \tag{12}$$

where x is the maximum distance between the impact origin and the transducers 12 before the acoustic signal becomes too attenuated.

In comparison, the maximum sensing area defined by the bounded region created by transducers 12 mounted at the center of each side of the bounded region is:

$$\pi \times x \times b \tag{13}$$

The system provides a rapid response time, making it suitable for interactive applications. For example, the digital signal processor 20 generally produces parameters within 50 msec of surface impact. In one embodiment, the computer 22 produces the impact coordinates 15 msec after receiving the parameters from the digital signal processor 20. The preceding combination of processing and calculating times yields a net system response time of approximately 65 msec. In a further embodiment, the cost is reduced and the response time of the system is potentially improved by replacing the digital signal processor 20 with a four-channel audio digitizer and performing all processing within computer 22.

As discussed previously, the rapid system-response time makes the impact-locating system advantageous for interactive displays. Referring again to FIG. 2, in one embodiment, the interactive content is stored and/or generated by in the host computer 22 in a conventional fashion. For example, an impact-locating system in accordance with the present invention can be used on a glass storefront with a graphic image projected onto a screen behind the glass. A user may then interact with the displayed information by knocking, tapping, and banging on the sensing surface 14. The user's impacts on the surface can be used to change the image contents and the image location on the sensing surface 14. Further, the nature of the impact (e.g., bash, knuckle tap, sharp impact, etc.) may also be used to vary the image displayed to the user. Additionally, a speaker may provide audible feedback (e.g., voice instructions, musical notes, etc.) to a user where the nature of the audible feedback varies as a result of the impact source, impact location, or both. Today, most individuals are very familiar with computer graphical interfaces wherein the user clicks images or clicks, holds, and drags images on the computer screen. If taps are analogized to clicks, then the addition of a sensor, such as a laser rangefinder or video tracker, for determining lateral movement adjacent the sensing surface 14 completes a graphical user interface thereon, with lateral movements analogized to dragging an image across the display area. In another embodiment, the location of objects in the vicinity of the sensing surface 14 is determined with a low-power range-finding radar. Feedback provided by rangefinders may also be used to activate a graphical interface from a "sleep mode" when a user approaches the sensing surface 14, e.g., to limit surface impact analysis only to periods when a user is proximate to the sensing surface 14. Again, bash-type impacts may be sensed for informational significance or to trigger a warning of inappropriate interaction with the sensing surface 14.

In a further embodiment, the system is retrofitted to an existing surface to create a sensate surface from an inanimate surface. The retrofit is accomplished by mounting the transducers 12 adjacent the sensing surface 14 and connecting the transducers 12, 30, 32 to the data acquisition system 16. The systems and methods of the present invention may be used to track surface impacts on sensing surfaces 14 fabricated from a wide variety of materials such as glass, metal, metal alloys, plastic, composites, laminates, and the like so long as the material will transmit an acoustic signal. Additionally, the systems and methods of the invention may be used regardless of the sensing surface orientation. In one embodiment, the invention is used with a horizontal surface, for example, a ping-pong table. In another embodiment, the invention is used with a vertical surface, for example, a glass storefront window.

While the invention has been shown and described with reference to specific embodiments, it should be understood by those skilled in the art that various changes in form and detail may be made therein without departing from the spirit and scope of the invention.

What is claimed is:

1. A method of determining an impact location, the method comprising the steps of:

receiving, with a plurality of transducers located at a plurality of locations on a surface, an acoustic signal created by the impact source;

with at least one data acquisition system, performing the steps of:

determining whether the received acoustic signal contains significant dispersion;

identifying the impact source using at least one of a correlation of the acoustic signal received at the locations, a rising edge analysis, a nearest neighbor analysis, or a leading edge analysis; and based on the determination of dispersion and the identification of the impact source, calculating the impact location.

2. The method of claim 1, further comprising a step selected from the group consisting of:

if the received acoustic signal does not contain significant dispersion, detecting a leading edge of the signal at each of the locations and, based thereon, calculating the impact location; and if the received acoustic signal does contain significant dispersion, processing the received signal.

3. The method as claimed in claim 2 wherein the processing step comprises cross-correlation of the signal as received at the plurality of locations.

4. The method as claimed in claim 2 wherein the processing step comprises filtering the signal as received at the plurality of locations with an adaptive filter.

5. The method as claimed in claim 2 wherein the processing step comprises tracking an acoustic signal position based on a linear prediction.

6. The method as claimed in claim 2 wherein the processing step comprises compressing the signal as received at the plurality of locations.

7. A system for locating an impact on a surface comprising:
   a plurality of transducers associated with the surface to detect an acoustic signal created by the impact; and
   a processor, responsive to the transducers, for determining whether the received acoustic signal contains significant dispersion, for identifying the impact source using at least one of a correlation of the acoustic signal received at the locations, a rising edge analysis, a nearest neighbor analysis, or a leading edge analysis, and for calculating an impact location based on the determination of dispersion and the identification of the impact source.

8. The system as claimed in claim 7 wherein the processor performs cross-correlation of the signal as received at the plurality of locations if the acoustic signal contains significant dispersion.

9. The method as claimed in claim 7 wherein the processor filters the signal as received at the plurality of locations with an adaptive filter if the acoustic signal contains significant dispersion.

10. The method as claimed in claim 7 wherein the processor tracks an acoustic signal position based on a linear prediction if the acoustic signal contains significant dispersion.

11. The method as claimed in claim 7 wherein the processor compresses the signal as received at the plurality of locations if the acoustic signal contains significant dispersion.

12. The system of claim 7, the processor further for, if the received acoustic signal does not contain significant dispersion, detecting a leading edge of the signal at each of the locations and, based thereon, calculating the impact location, and if the received acoustic signal does contain significant dispersion, processing the received signal and then calculating the impact location.

* * * * *

UNITED STATES PATENT AND TRADEMARK OFFICE
CERTIFICATE OF CORRECTION

PATENT NO. : 7,643,015 B2  Page 1 of 1
APPLICATION NO. : 10/155874
DATED : January 5, 2010
INVENTOR(S) : Paradiso et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1740 days.

Signed and Sealed this

Sixteenth Day of November, 2010

David J. Kappos
*Director of the United States Patent and Trademark Office*